Patented Aug. 8, 1950

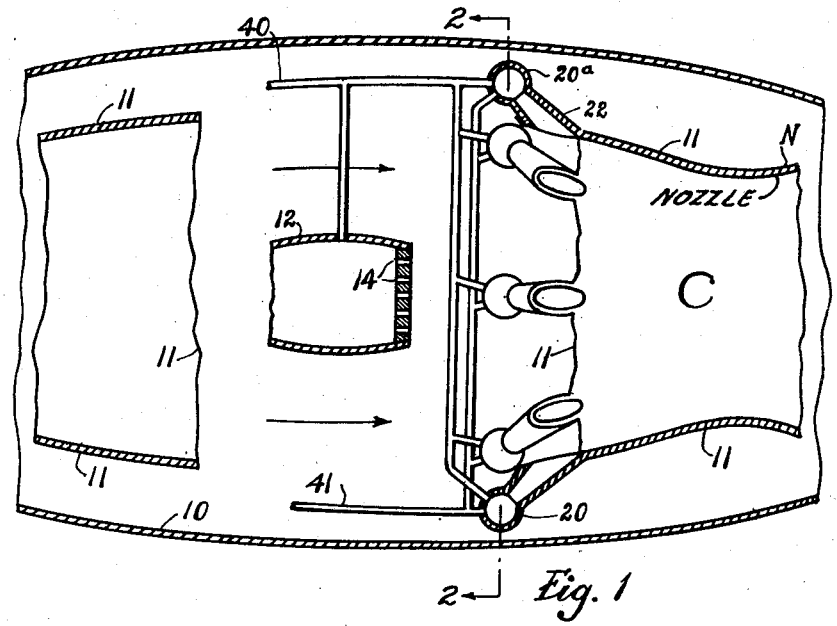
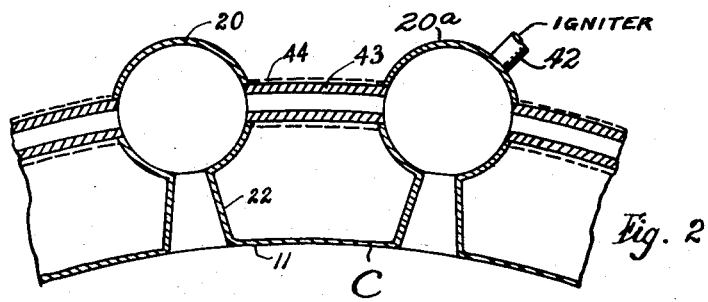
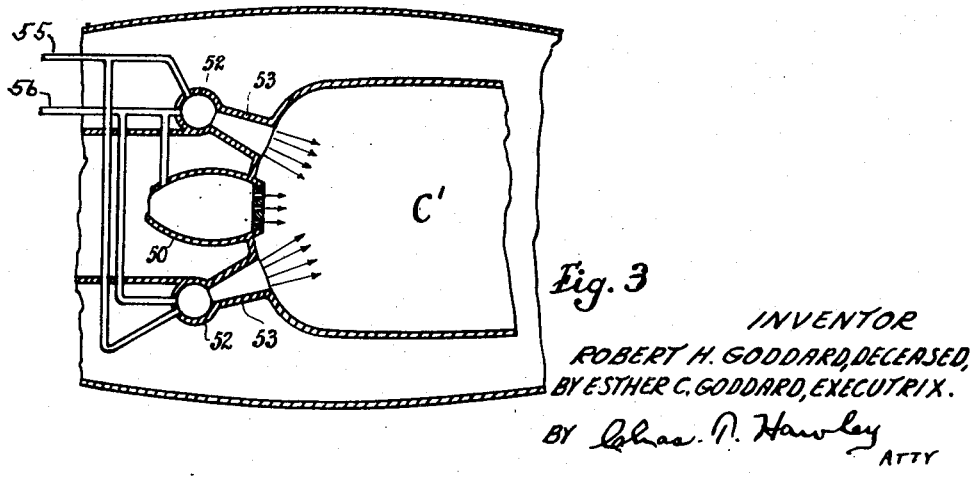

2,518,000

UNITED STATES PATENT OFFICE 2,518,000

AUXILIARY COMBUSTION CHAMBERS FOR REACTION JET PROPULSION APPARATUS

Robert H. Goddard, deceased, late of Annapolis, Md., by Esther C. Goddard, executrix, Paxton, Mass., assignor of one-half to The Daniel and Florence Guggenheim Foundation, New York, N. Y., a corporation of New York Application March 1, 1946, Serial No. 651,328

4 Claims. (Cl. 60—35.6)

This invention relates to aircraft in which propulsion is effected by the reaction of a stream or jet of atmospheric air mixed with heated combustion gases.

It is the general object of the present invention to provide additional power or thrust in this type of aircraft for use when such additional power is needed or desired.

To the attainment of this general object, the invention relates more specifically to the provision of a plurality of relatively small auxiliary combustion chambers and nozzles grouped about a basic fuel feeding unit and discharging combustion gases into the main combustion chamber and reaction jet and preferably from all sides thereof.

The invention further relates to arrangements and combinations of parts which will be hereinafter described and more particularly pointed out in the appended claims.

Preferred forms of the invention are shown in the drawing, in which:

Fig. 1 is a partial sectional side elevation of an aircraft embodying this improvement;

Fig. 2 is a transverse sectional view, taken along the line 2—2 in Fig. 1; and

Fig. 3 is a partial longitudinal sectional view showing a modified construction.

Referring to Figs. 1 and 2, a portion of the aircraft is shown comprising an outer casing 10 and an inner casing 11 terminating in a discharge nozzle N. A fuel feeding unit 12 is axially positioned within the casing 11 and discharges liquid fuel rearwardly into the air stream through a plurality of fine feed openings 14. The air stream entering from the front of the aircraft flows around the feeding unit 12 and intermingles with the liquid fuel to form a combustible mixture, which burns in the combustion chamber C and is discharged through the reaction nozzle N.

Any usual means may be provided for starting the aircraft in flight such as a motor-driven propeller or a catapult.

For purposes of providing additional power, a series of small combustion chambers 20 are mounted in a circular series about the combustion chamber C and preferably in the space between the outer casing 10 and the inner casing 11. Each auxiliary combustion chamber 20 is provided with a nozzle 22 discharging into the combustion chamber C and substantially inclined in the direction of travel of the combustion gases forming the main reactive jet.

As the auxiliary chambers 20 are preferably symmetrically grouped about the casing C as shown in Fig. 2, they discharge into the main reaction jet from all sides and not only increase the speed of the main jet by their own added velocity but also raise the temperature of the main jet and thus further increase its reactive efficiency.

Liquid fuel may be fed to the unit 12 and to the auxiliary chambers 20 through a supply pipe 40 and suitable branch pipes, and air or liquid oxygen for combustion may be fed to the auxiliary chambers 20 through a supply pipe 41 and additional branch pipes.

Ignition may be started in a selected auxiliary chamber 20a by an igniter 42 (Fig. 2) and may be communicated to the other auxiliary chambers 20 by the flow of hot combustion gases from chamber to chamber through connecting tubes 43, said combustion gases being always under pressure. These tubes may be insulated as indicated in broken lines at 44 in Fig. 2 to withstand extreme heat conditions.

This arrangement of auxiliary combustion chambers is highly efficient, as the gases are discharged in the general direction of flow of the main reaction jet and are also discharged into a jet which is heated and already in motion at substantial speed.

Consequently there is much less shock and loss of power than would occur if the nozzles were directed outward and discharged into the atmosphere through the outer casing 10. Furthermore, by discharging into the main jet, the heat from the auxiliary combustion chambers is conserved and added to the heat generated in the main combustion chamber C. Both the speed and the temperature of the main jet is thereby increased.

By throwing the auxiliary chambers into operation, additional power is thus made available whenever required or desirable.

A modified construction is shown in Fig. 3, in which the fuel feeding unit 50 is relatively smaller and in which the auxiliary chambers 52 and nozzles 53 are mounted closer to the feeding unit 50 and substantially in the plane of the unit, rather than rearward thereof as shown in Fig. 1. Combustion liquids are supplied to the chambers 52 through pipes 55 and 56 as in the construction shown in Fig. 1. Consequently the hot combustion gases are mingled with the air stream in the combustion chamber C' more closely adjacent the point of entry of the air stream to the chamber and at the point where combustion is initiated. More complete combustion may thus be obtained under certain operative conditions.

Having thus described the invention and the advantages thereof, it will be understood that the invention is not to be limited to the details herein disclosed, otherwise than as set forth in the claims, but that what is claimed is:

1. In an aircraft, propulsion apparatus comprising a main combustion chamber, a discharge nozzle for said chamber, means to supply a stream of intermingled combustible products to said chamber, and a plurality of relatively small auxiliary combustion chambers grouped about said main chamber and having nozzles connected directly into said main chamber and through which nozzles additional combustion gases are discharged into said main chamber, whereby the force and effectiveness of the main reactive jet is substantially increased.

2. The combination in propulsion apparatus as set forth in claim 1, in which the auxiliary chambers and nozzles are directed rearward and are substantially inclined with respect to the axis of the main chamber and in the direction of flow of the main reactive jet.

3. In an aircraft, a body having an outer casing and a spaced inner casing, said inner casing comprising an air conduit terminating rearward in a combustion chamber and discharge nozzle, a feeding unit for liquid fuel located in said conduit and forward of said combustion chamber, a plurality of relatively small auxiliary combustion chambers and discharge nozzles positioned about said main combustion chamber and between said casings and discharging combustion gases substantially rearward into the main reactive jet produced in said main combustion chamber, and means to ignite the combustible mixture in said auxiliary combustion chambers.

4. In an aircraft, a body having an outer casing and a spaced inner casing, said inner casing comprising an air conduit terminating rearward in a combustion chamber and discharge nozzle, a feeding unit for liquid fuel located in said conduit and forward of said combustion chamber, a plurality of relatively small auxiliary combustion chambers and discharge nozzles positioned about said main combustion chamber and discharging combustion gases substantially rearward into the main reactive jet produced in said main combustion chamber, means to ignite the combustible mixture in one of said auxiliary chambers, and means to ignite the remaining auxiliary chambers from said first auxiliary chamber.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 2,409,176 | Allen | Oct. 15, 1946 |
| 2,417,445 | Pinkel | Mar. 18, 1947 |

FOREIGN PATENTS

| Number | Country | Date |
|---|---|---|
| 439,805 | Great Britain | Dec. 6, 1935 |
| 770,326 | France | June 25, 1934 |
| 554,906 | Germany | Nov. 2, 1932 |